Nov. 17, 1931.  J. R. GEORGE  1,832,111
POWER TRANSMISSION MECHANISM
Filed April 19, 1929
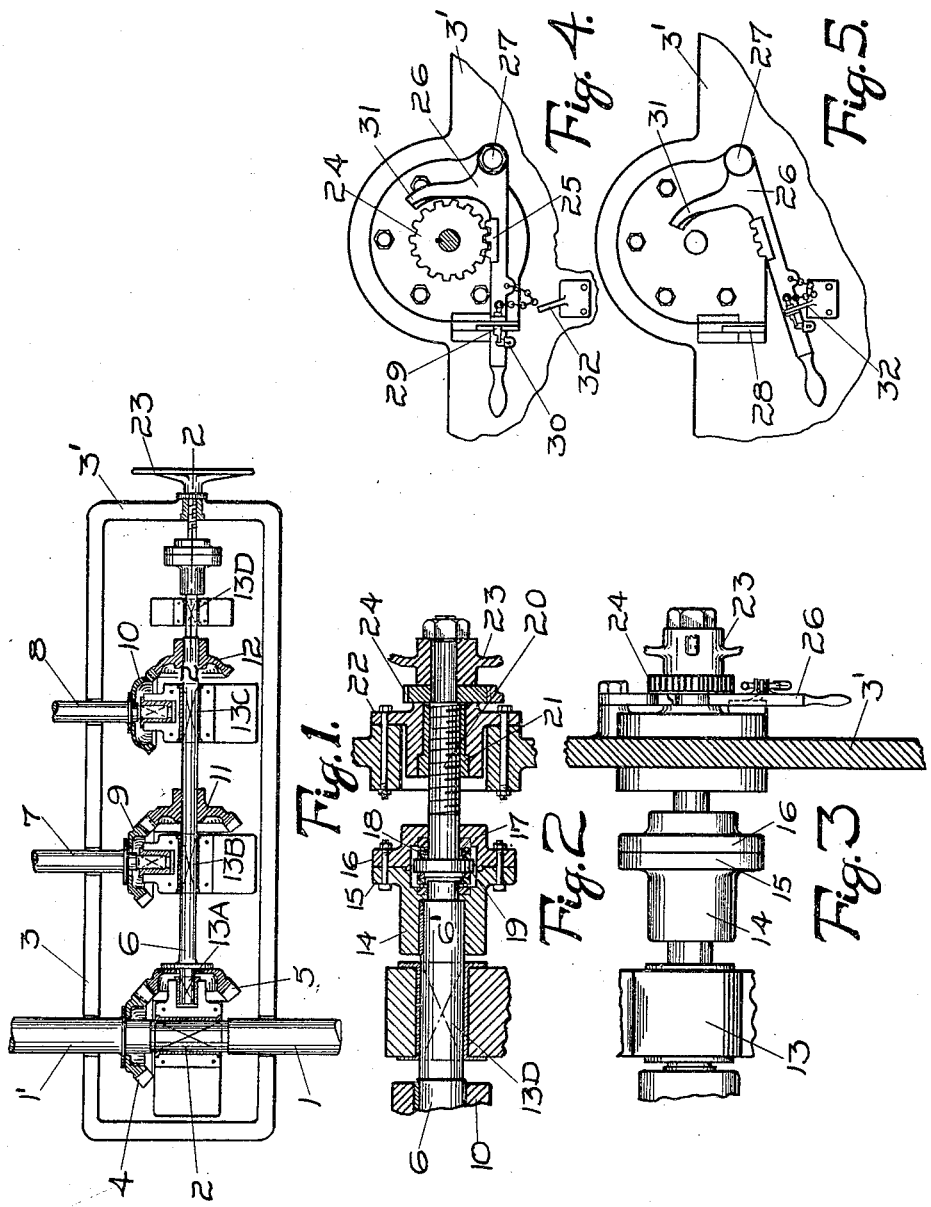
INVENTOR
Jerome R. George
By Geo. H. Kennedy Jr.
Attorney Patented Nov. 17, 1931

1,832,111

UNITED STATES PATENT OFFICE

JEROME R. GEORGE, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS

POWER TRANSMISSION MECHANISM

Application filed April 19, 1929. Serial No. 356,411.

The present invention relates generally to power transmission mechanism. In particular, the invention is concerned with mechanism by which a gear-driven shaft, which itself, through gearing, effects the drive of one or more other shafts, may be completely disconnected at will from its driving means, so that the latter is left entirely free.

In the case, for example, of a countershaft, driven by bevel gearing from a main shaft and serving through other sets of bevel gears to impart rotation to one or more driven shafts running parallel to the main shaft, an expedient commonly employed to secure, when desired, the stoppage of said driven shaft or shafts, is a clutch by which the countershaft, beyond its point of gear connection to the main shaft, may be stopped or started. However, this expedient leaves the gear on the divided countershaft in constant mesh with the driving gear on the main shaft, a condition that not only involves a certain wastage of power, but which is otherwise detrimental in the operation of high speed gearing. Another expedient is that of giving either of the main driving gears a loose sliding fit on its shaft, for longitudinal movement into and out of mesh with the companion gear on the other shaft; this is also an unsatisfactory arrangement with high speed gearing.

The present invention provides a mechanism which overcomes the disadvantages of both of the above described methods, by providing for limited longitudinal movement of the countershaft itself, to simultaneously put all the gears which it carries into and out of mesh with the respective driving and driven gears of the combination. Other and further objects and advantages of the invention will appear from the following detailed description thereof, taken in connection with the accompanying drawings, in which—

Fig. 1 is a top plan view of power transmission mechanism to which my invention is applied.

Fig. 2 is a fragmentary large scale sectional view on the line 2—2 of Fig. 1.

Fig. 3 is a view in elevation, partly in section, of the mechanism shown in Fig. 2.

Fig. 4 is a fragmentary large scale view, in end elevation, showing the mechanism as viewed from the right hand end of Fig. 1.

Fig. 5 is a view similar to Fig. 4, showing the parts in a different position.

Like reference characters refer to like parts in the different figures.

Referring first to Fig. 1, the arrangement of power transmission mechanism therein shown by way of example to illustrate my invention, comprises a main driving shaft 1 which may be suitably journalled in a bearing 2, provided interiorly of a gear casing 3, beyond which the shaft 1 may be extended, as shown at 1', to impart its rotation continuously to some piece of apparatus, such, for example, as a stand of rolls in a rolling mill, not shown. Within the gear box 3 the shaft 1 has secured thereto, as herein shown, a bevel gear 4, the latter being adapted to mesh with a bevel gear 5 secured to a shaft 6 that extends at right angles to the shaft 1 within the gear casing 3. Said shaft 6, deriving its rotation from main shaft 1, may itself serve to impart rotation to one or more other shafts, such as shown at 7 and 8 herein, which are substantially parallel to the main shaft 1 and which may be used, for example, to impart rotation to pieces of apparatus, not shown, that are operatively related to the apparatus driven by the main shaft 1; for example, other adjacent stands of rolls in a rolling mill, not shown. To this end, the shafts 7 and 8, as herein shown, have secured thereto the bevel gears 9 and 10, respectively, which are adapted to mesh respectively with bevel gears 11 and 12 on the countershaft 6.

With such an arrangement of power transmission mechanism, the necessity may frequently arise for a discontinuance in the transmission of power to the devices or apparatus whose operation is secured by the power which the countershaft 6 transmits; for instance, in the example of rolling mill apparatus above assumed, it may be desired to vary the rolling mill operation by cutting out the two stands of rolls that are served by the two shafts 7 and 8, thus causing the material to be rolled or finished only in the stand of rolls that is served by the main shaft 1. My invention is particularly adapted to take care of such a situation, and it does this in the absence of the usual expedients of clutches, or sliding gears, in the following manner:—

The several bearings 13a, 13b, 13c and 13d in which the shaft 6 is journalled, are such as to offer no obstruction to limited axial movement of said shaft; that is to say, in the arrangement shown, these bearings 13a, 13b, 13c and 13d take none of the right hand end thrust of shaft 6. Said shaft 6 at its right hand end has an extension 6' beyond the outermost bearing 13d, and to this extension is secured an annular member 14 having a flange or collar 15, to which is bolted, or otherwise attached, a collar 16 of a second annular member 17. The two members 14 and 17 inclose a space 18 wherein is received the enlarged head 19 of a screw 20, the latter being held in axial alinement with the shaft 6 by the reception of its threads in a threaded lining sleeve 21, which is secured within a stationary member 22 attached to the end wall 3' of gear box 3. Rotation of the screw 20 in one direction moves its head 19 to the left, to effect a corresponding movement of shaft 6, whereupon said screw serves to take the right hand end thrust of said shaft; rotation of the screw 20 in the opposite direction serves, through said head 19 and the members 17 and 14, to draw the shaft 6 to the right, a movement which carries the several gears 5, 11 and 12 of said shaft out of mesh with their respective companion gears 4, 9 and 10.

The rotation of screw 20 for these purposes may be obtained by a hand wheel 23, secured to the outer end of said screw which projects outside the gear box 3. Said projecting end of screw 20 also carries a toothed wheel 24, with which is adapted to cooperate a locking tooth or teeth 25 provided on a lever 26, the latter being fulcrumed at 27 on the outside of end wall 3'. As shown in Fig. 4, an upward movement of lever 26 carries the locking teeth 25 into engagement with the toothed wheel 24, thus to prevent any turning of the screw 20 by the hand wheel 23. This arrangement is brought into use after screw 20 has been turned to produce inward movement of shaft 6 to carry its several gears 5, 11 and 12 into mesh with their respective companion gears 4, 9 and 10, as a means to lock and hold the shaft 6 in this, its operative position; to this end, the lever 26 in its upper position, shown in Fig. 4, cooperates with a lug 28 on the gear box wall 3' to provide an aperture for the passage of a bolt 29, the latter being equipped, if desired, with a padlock 30, so that, once the shaft 6 has been moved into its operative position, it is impossible for any displacement thereof, accidental or otherwise, to be accomplished, until an authorized operator may desire to render said shaft 6 inoperative for the transmission of power. Then, upon release of padlock 30 and withdrawal of bolt 29, the lever 26 may be moved to free the wheel 24 of the locking teeth 25,—this action permitting the screw 20, through hand wheel 23, to be screwed outwardly, so as to shift the shaft 6 to the right, carrying its gears 5, 11 and 12 out of mesh, respectively, with the companion gears 4, 9 and 10. By this outward movement of screw 20, the toothed wheel 24 is spaced from the stationary member 22, and into this space is received, upon the lowering of lever 26, a projection 31 of said lever, as shown in Fig. 5. The locking of lever 26 in its depressed position, Fig. 5, is obtained by the cooperation of bolt 29 with a projection 32 on the gear box, and thus the projection 31 of said lever, which is of a thickness to substantially fill the space in question, is securely locked in its space-filling position. This effectually prevents any such tampering with the hand wheel 23 as might produce a premature return of the shaft 6 to its operative position, since the projection 31 stands as an obstruction to any inward movement of the screw 20.

By the above-described arrangement of taking the end thrust of shaft 6 upon the screw 20, the latter serves additionally as a means to adjust the tooth contact of the several sets of intermeshing gears 4, 5 and 9, 11, and 10, 12. When the screw 20 is used to pull the shaft 6 to the right, as above described, all the gears in the box 3 stop their rotation, except the gear 4, but the latter's rotation requires no power other than that for overcoming the air friction. Under these conditions, the churning and heating of the lubricant in the box 3 is reduced to a minimum.

In that position of lever 26 which is taken under the influence of gravity, namely the position shown in Fig. 5, no endwise movement of the shaft 6, tending to establish the driving connection, is possible. This affords an additional safety feature, in that it prevents the several gears from being accidentally thrown into mesh, while the main driving gear is revolving at high speed; in other words, the act of meshing the gears invariably requires on the part of the operator, an intentional and deliberate elevation of the lever 26 into the position shown in Fig. 4, before any endwise movement of the shaft 6 is possible, and of course this elevation and endwise movement would not be undertaken until the driving gear 4 had been slowed down sufficiently for the purpose desired. On the other hand, no such precaution is necessary in connection with the act of unmeshing the gears, since no damage is done if they come out of mesh while revolving at high speed; hence, the fact that the lever 26, if not locked in the position of Fig. 4, might drop by gravity toward the position of Fig. 5, is not important. A further refinement of my invention resides in making the countershaft gears 5, 11 and 12 with teeth of gradually decreasing length, as shown in Fig. 1. This enables these gears to be meshed with their companion gears 4, 9 and 10, one pair at a time, instead of requiring all three sets of teeth to be matched up simultaneously.

I claim,

1. In mechanism of the class described, the combination with a shaft having gears thereon adapted to mesh with driving or driven gears, of a screw in substantial axial alinement with said shaft, said screw being rotatable independently of said shaft to move said shaft endwise in opposite directions for the engagement and disengagement of its gears with the driving or driven gears, and means for locking said shaft in both the engaged and disengaged positions of its gears, said means comprising a lever adapted in one of said gear positions to prevent rotation of said screw, and in the other of said gear positions to oppose endwise movement in one direction of said screw.

2. In mechanism of the class described, the combination with a shaft having gears thereon adapted to mesh with driving or driven gears, of a screw in substantial axial alinement with said shaft, said screw being rotatable to move said shaft endwise in opposite directions for the engagement and disengagement of its gears with the driving or driven gears, and means for locking said screw, in the disengaged position of said gears, against any movement tending to produce re-engagement of said gears, said means comprising an obstruction movable by gravity to interpose itself in the path of endwise movement, in one direction, of said screw.

3. In mechanism of the class described, the combination with a shaft having gears thereon adapted to mesh with driving or driven gears, of a screw in substantial axial alinement with said shaft and rotatable independently of said shaft, said screw, when turned in one direction, thrusting said shaft endwise to engage its gears with the driving or driven gears, means for procuring the opposite endwise movement of said shaft by turning said screw in the other direction, thereby to disengage the shaft gears from the driving or driven gears, and means operable on said screw to retain said shaft against endwise displacement in both the engaged and the disengaged positions of said gears, said means comprising a locking lever adapted in one of said gear positions to engage peripherally with said screw, to hold it against rotation, and adapted in the other of said gear positions to obstruct endwise movement in one direction of said screw.

4. In mechanism of the class described, a shaft whose endwise movement in opposite directions procures, respectively, the engagement and disengagement of driving and driven gears, a screw rotatable independently of said shaft in opposite directions to procure the opposite endwise movements of said shaft, means for locking said screw against rotation in either direction when said shaft is in position to engage said gears, and means responsive to the release movement of said locking means for interposing an obstruction to the return of said shaft to gear-engaging position, after rotation of said screw has moved said shaft to disengage said gears.

5. In mechanism of the class described, a shaft whose endwise movement in opposite directions procures, respectively, the engagement and disengagement of driving and driven gears, a screw rotatable independently of said shaft in opposite directions to procure the opposite endwise movements of said shaft, and a locking lever for said screw, adapted in the engaged position of said gears to positively hold said screw against rotation in either direction, said lever, upon its movement to release said screw, for the latter's rotation to effect gear-disengaging movement of said shaft, presenting an obstruction to that endwise movement of the screw which returns said shaft to gear-engaging position.

JEROME R. GEORGE.